United States Patent [19]

Drury

[11] 4,011,512

[45] Mar. 8, 1977

[54] ELECTRICAL COMPONENT FAILURE DETECTION APPARATUS

[75] Inventor: David Michael Drury, Mundelein, Ill.

[73] Assignee: Motorola, Inc., Schaumburg, Ill.

[22] Filed: May 21, 1975

[21] Appl. No.: 579,528

[52] U.S. Cl. .............................. 325/150; 325/186
[51] Int. Cl.² ......................................... H03G 3/18
[58] Field of Search .......... 325/150, 151, 137, 186, 325/187, 159; 340/248 A; 324/57 A, 57 R

[56] References Cited
UNITED STATES PATENTS

| | | | |
|---|---|---|---|
| 2,213,099 | 8/1940 | Adorjan | 324/57 R |
| 2,298,930 | 10/1942 | Decino | 325/159 |
| 3,486,128 | 12/1969 | Lohrmann | 325/159 |
| 3,641,451 | 2/1972 | Hollingsworth et al. | 325/151 |
| 3,852,669 | 12/1974 | Bowman et al. | 325/151 |

*Primary Examiner*—Richard Murray
*Attorney, Agent, or Firm*—James W. Gillman; Victor Myer; Phillip Melamed

[57] ABSTRACT

A harmonic filter failure detection apparatus for use in a single sideband radio transmitter is disclosed. A first directional coupler measures the power delivered to the harmonic filter and a second directional coupler measures the power passed through the harmonic filter. The power measurements of the first and second directional couplers are then compared in a latch type comparator circuit and a control signal output is developed which indicates whether or not the harmonic filter is operating properly. The control signal output is used to shut down the single sideband transmitter when a filter failure has been detected.

11 Claims, 2 Drawing Figures

ELECTRICAL COMPONENT FAILURE DETECTION APPARATUS

BACKGROUND OF THE INVENTION

The invention relates generally to the field of failure detection circuits for electrical components and more particularly to failure detection circuits for harmonic filters which are used in single sideband transmitters.

Single sideband transmitters usually cover several separated frequency bands with each band requiring a different harmonic filter in order to prevent the transmission of the harmonics of the carrier frequency. The harmonic filter is commonly placed between the final RF (radio frequency) power amplifier stage and the antenna, so that any harmonics generated by this last amplifier will also be filtered out. The frequency response of the harmonic filter is changed (programmed) for each one of the frequency bands that the transmitter will be operated at. If either the harmonic filter or the antenna has the wrong input impedance, large amounts of RF power will be reflected back into the final power amplifier stage. This can cause the expensive power amplifying devices in the final stage to burn out.

Typically, a single directional coupler is placed between the output of the harmonic filter and the antenna. This directional coupler is used to provide an indication of both the forward power delivered to the antenna and the reverse power reflected back by the antenna. The forward power indication is used to control the output of the final amplifier stage so as to maintain the transmitter output at a constant desired level. The reflected power indication is used to shut down the final amplifier stage whenever the ratio of the reflected to forward power indicates a high voltage standing wave ratio (VSWR) for the antenna. This indication of antenna VSWR provides a convenient way of monitoring the antenna input impedance and preventing large amounts of power from being reflected by an antenna impedance mismatch. A disadvantage of this system is that the directional coupler only measures the antenna VSWR and will not shut down the final amplifier when a high VSWR occurs because of either an electrical failure of the filter or the selection of the wrong harmonic filter for a particular frequency band.

A single directional coupler cannot be located prior to the harmonic filter to give a useful measurement of the VSWR of the filter. This is because the forward power into the filter contains the desired signal to be transmitted plus all of its harmonics, whereas the reflected power contains primarily the harmonics. Since the magnitude of these harmonics will vary considerably with both the transmitter operating frequency and the filter input impedance, an accurate indication of the harmonic filter VSWR cannot be obtained. Also, this single directional coupler would measure the combined VSWR of both the harmonic filter and the antenna, and therefore be incapable of distinguishing a filter failure from an antenna failure. In addition, this single directional coupler could not be used to accurately monitor and control the actual transmitted output power, since the monitored forward power includes the signal to be transmitted and all of its harmonics and none of these harmonics will be actually transmitted. Thus the prior art does not provide an adequate system of protecting against the failure or misprogramming of a harmonic filter in a single sideband radio which operates over several discrete frequency bands.

SUMMARY OF THE INVENTION

An object of the present invention is to provide an improved electrical component failure detection apparatus for accurately indicating when a component, used with radio frequency power generating equipment, has failed to function properly.

A more particular object of the invention is to provide such an improved failure detection apparatus for a harmonic filter which is used in a single sideband radio transmitter that is operative over several discrete frequency bands.

In one embodiment of the present invention a failure detection apparatus is provided, comprising: power means for generating power signals; components means having an input terminal coupled to said power means and an output terminal, said component means receiving said power signals at said input terminal and developing corresponding output signals at said output terminal; load means coupled to said component output terminal for receiving said output signals; first means coupled to said power means for producing a first signal related to said power signals; second means coupled to said load means for producing a second signal related to said output signals; and comparator means coupled to said first and second means for producing a control signal in response to said first and second signals, whereby said control signal is used to indicate a failure of said component means.

Basically, a final stage RF power amplifier feeds power through a harmonic filter and into an antenna load. A first directional coupler, located between the power amplifier and the filter, monitors the forward power fed into the filter and a second directional coupler, located between the filter and the antenna, monitors the forward power fed into the antenna. A failure detector circuit, which is basically a latch type comparator circuit, compares the power into and out of the harmonic filter and generates a control signal related to the ratio of these powers. Whenever the harmonic filter fails or the wrong harmonic filter for a particular frequency band is used, the output power will be substantially less than the input power and the comparator circuit will generate a control signal which will effectively shut off the RF power generated by the final power amplifier. A "filter failure" is functionally defined to include any malfunction in which the ratio of the filter output to input power is below a predetermined value. Thus a bad solder connection between the filter and the second coupler is also considered a "filter failure."

The second directional coupler can also be used to measure the reflected power from the antenna and therefore measure the VSWR of the antenna. Also, a signal related to the forward power monitored by this coupler can be used in a gain control loop to maintain the actual transmitted power at a constant level, as long as a high antenna or filter VSWR does not occur.

BRIEF DESCRIPTION OF THE DRAWINGS

For a more complete understanding of the invention reference should be made to the drawings, in which.

DESCRIPTION OF THE PREFERRED EMBODIMENT

Figure 1:
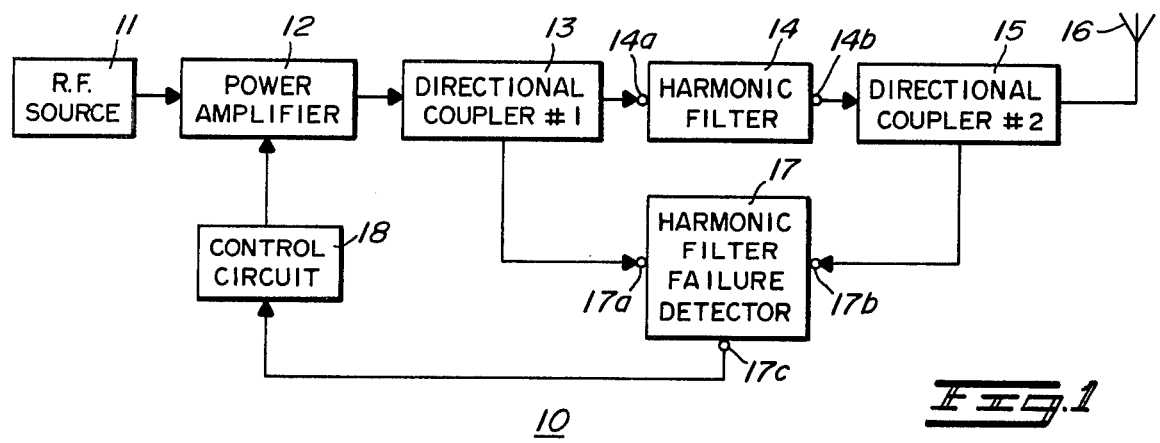
FIG. 1 is a block diagram of a single sideband transmitter embodying the present invention.

FIG. 1 illustrates a single sideband transmitter 10 which basically consists of an RF source 11, a power amplifier 12, a first directional coupler 13, a harmonic filter 14, a second directional coupler 15 and an antenna 16, all connected substantially as shown. A harmonic filter failure detector 17, which is a latch type comparator circuit, receives input signals from the couplers 13 and 15 at input terminals 17a, and 17b, respectively. A control signal is produced by the failure detector 17 at an output terminal 17c which is coupled to a control circuit 18 that is in turn coupled to amplifier 12 to control the RF power output of the amplifier.

The RF source 11 is essentially a generator which supplies RF signals in each of the frequency bands in which the transmitter 10 is to be operated. These RF signals are then amplified by the power amplifier 12. The amplification inherently creates harmonics of the fundamental carrier frequencies generated by RF source 11. These harmonics are especially significant when amplifier 12 is a class C amplifier. The harmonic filter 14 prevents these harmonic frequencies from reaching the antenna 16 and subsequently being radiated. Thus the harmonic filter 14 comprises, basically, a low or band pass filter which has a different frequency response for each of the operative frequency bands of the transmitter 10.

The directional coupler 13 monitors the forward power transmitted from the power amplifier 12 to an input terminal 14a of the harmonic filter 14. A DC signal related to the magnitude of the forward power is coupled to the terminal 17a of the detector (comparator) circuit 17. The directional coupler 15 monitors the forward power transmitted from a filter output terminal 14b to the antenna 16, and a related DC signal is supplied to the terminal 17b of the detector. A control signal is produced by the detector at an output terminal 17c when the DC input signals from the couplers 13 and 15 indicate that a substantial amount of the power supplied to the harmonic filter 14 is not being transmitted therethrough. The control signal at 17c is then used to trip a relay device in the control circuit 18 that results in reducing the amplified RF signals produced by power amplifier 12.

Since the transmitter 10 is intended for multi-band operation, the harmonic filter 14 consists of either a series of individual filters, one of which is selected for each frequency band, or a single filter which is modified (programmed) for each frequency band of operation. The frequency band selecting is accomplished by electrical or mechanical switching. In either case, the probability that the harmonic filter 14 will be tuned to a frequency band not corresponding to the frequency band being produced by the RF source 11 is extremely high. Whenever the harmonic filter is mistuned or misconnected, the possibility exists that a large amount of RF power will be reflected, by the filter 14, back into the power amplifier 12. High reflected power can easily destroy the power amplifier, and therefore this condition must be guarded against. Since direct measurements of this reflected power are unsatisfactory, the present invention contemplates comparing the power received by the harmonic filter 14 (as measured by directional coupler 13) to the power transmitted through the filter (as measured by directional coupler 15). Whenever the harmonic filter is mistuned, the filter output power measured by coupler 15 will be substantially below the filter input power measured by coupler 13. By comparing these two measurements in the detector 17, an accurate and reliable apparatus for detecting the failure of the filter 14 is provided.

The circuitry within each of the blocks illustrated in FIG. 1 will now be explained more fully. The RF source 11 may comprise standard oscillator and modulation circuits (not shown) which produce the RF carrier frequencies for all of the frequency bands that the transmitter 10 will be operated in. The power amplifier 12 may consist of a standard RF amplification stage which receives these RF signals from source 11.

The control circuit 18 may comprise a relay tape device (not shown) connected to the power amplifier 12 to reduce the RF output of the power amplifier in response to a control signal received from terminal 17c. The RF output can be reduced by many different techniques, such as shorting the received RF input signal to ground or removing the DC bias of the amplifier. Circuits well known in the prior art can accomplish these functions.

The directional couplers 13 and 15 may consist essentially of bridge circuits (not shown) which are connected so as to develop a signal proportional to the power passed through the coupler in a given direction. These couplers contain rectifier type circuits (not shown) to create a DC signal related to this power. The internal configuration of the couplers 13 and 15 is well known in the prior art and many types of these directional couplers are commercially available.

Figure 2:
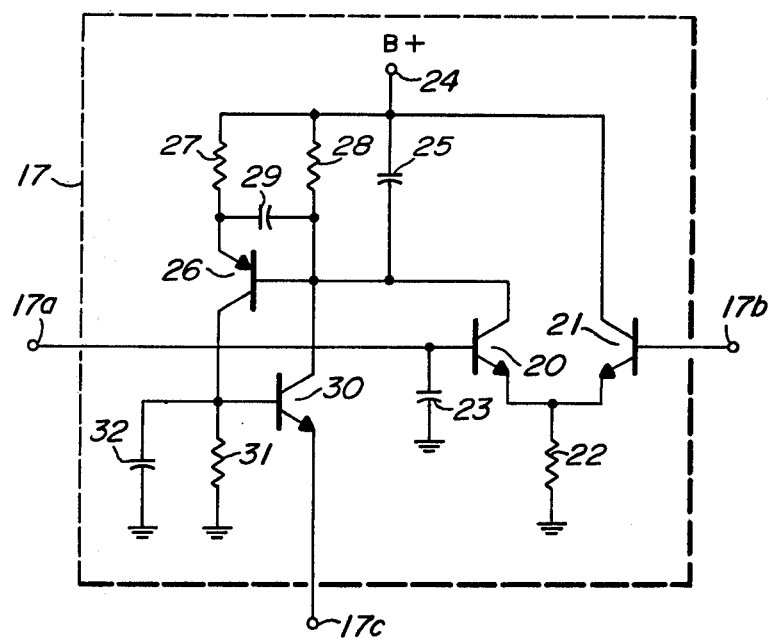
FIG. 2 is a schematic diagram of one of the components illustrated in FIG. 1.

Referring now to FIG. 2, a schematic diagram of the detector circuit 17, shown in FIG. 1, is illustrated with corresponding terminals identically numbered. Two NPN transistors 20 and 21 have their bases connected to terminals 17a and 17b, respectively, and form a differential amplifier. The emitters of the transistors are connected together and are connected to ground through a resistor 22. The base of transistor 20 is coupled to ground through a capacitor 23 which provides an RF bypass path that prevents RF signals from biasing the transistor. The collector of transistor 21 is connected to a B+ terminal 24, and a capacitor 25 is coupled between this terminal and the collector of transistor 20.

A PNP transistor 26 has its emitter connected to terminal 24 through a resistor 27, and its base connected to terminal 24 through a resistor 28. Transistor 26 also has its base connected to its emitter through a capacitor 29 and connected directly to the collector of transistor 20. An NPN transistor 30 has its collector connected to the base of transistor 26, its emitter connected to terminal 17c, and its base directly connected to the collector of transistor 26 and connected to ground through the parallel connection of a resistor 31 and a capacitor 32. Terminal 17c has a connection to ground (not shown in FIG. 2) through circuitry located in the control circuit 18.

The transistors 20 and 21 and the resistor 22 form an input differential amplifier. The capacitor 23, in addition to functioning as an RF bypass, also provides additional filtering for the control voltage received by terminal 17a from the coupler 13. This control voltage has been attenuated by a voltage divider circuit in coupler 13 such that when the harmonic filter 14 is properly operative, the voltage on terminal 17b will be slightly greater than the voltage on terminal 17a, regardless of the magnitude of the filter input power. Therefore transistor 21 will be turned on and transistor 20 will be turned off when the filter 14 is functioning properly. In this condition, resistors 28 and 31 will prevent transistors 26 and 30 from being turned on.

When the harmonic filter fails because of mistuning or burn out, the power sensed by coupler 15 will decrease causing a corresponding decrease in the control voltage at terminal 17b, which will in turn cause transistor 20 to be turned on and transistor 21 to be turned off. The collector current of transistor 20 will now cause transistor 26 to be turned on and this in turn creates a high voltage at the base of transistor 30 which is used to bias transistor 30 on. Once transistor 30 is turned on, the collector current of this transistor will maintain a current flowing through resistor 28 which is sufficient to keep transistor 26 in an on condition. Thus the detector circuit 17 functions as a latch type comparator in that once a failure has been detected a constant control signal is maintained at terminal 17c. This latch type comparator is reset only by removing DC power from terminal 24. Thus when the control signal produced at terminal 17c shuts off the power amplifier 12, no oscillating condition is created in the comparator circuit by the transistors 20 and 21 reverting to their previous on-off states.

Capacitors 25 and 32 prevent the latch from being triggered by transients which appear on terminal 24 or terminals 17a and 17b. Capacitor 29 prevents stray RF energy from also triggering the latch.

The present invention contemplates using the forward power DC control voltage from the directional coupler 15 to control the output of the power amplifier 12 so as to maintain the power delivered to the antenna 16 at a relatively constant level. Thus the directional coupler 15 will produce a control voltage which is used not only to detect when the harmonic filter has failed, but is also used in a gain control loop to control the output power of the single side band transmitter 10. It is also contemplated by the present invention that coupler 15 will monitor the reflected power from the antenna 16 and an additional control signal will be developed. This additional control signal will produce an independent indication of the antenna VSWR. The filter failure detector circuit is always contemplated as exercising primary control over the power amplifier 12, while the antenna VSWR circuitry and any automatic gain control circuitry will exercise secondary control over this power amplifier.

The present invention has therefore provided a general failure detection apparatus which can accurately and reliably detect when a harmonic filter, which is used in a single sideband radio, has been misprogrammed or has encountered an electrical failure. However, the scope of the present invention is not limited to either the failure detection of a filter or the failure detection of any component in a single sideband radio. While I have shown and described specific embodiments of this invention, further modifications and improvements will occur to those skilled in the art. All such modifications which retain the basic underlying principles disclosed and claimed herein are within the scope of this invention.

I claim:

1. An electrical component failure detection apparatus for use with radio frequency power generating equipment, comprising:
   power means for generating power signals;
   component means having an input terminal coupled to said power means and an output terminal, said component means receiving said power signals at said input terminal and developing corresponding output signals at said output terminal;
   load means coupled to said component output terminal for receiving said output signals;
   first means, including a first directional coupler coupled between said power means and said component means, for producing a first DC signal indicating the forward power delivered to said component means;
   second means, including a second directional coupler coupled between said load means and said component means, for producing a second DC signal indicating forward power delivered to said load means;
   comparator means coupled to said first and second means for producing a failure detecting control signal in response to said first and second signals; and
   control means coupled to said power means and said comparator means for reducing said power signals generated by said power means in response to said control signal.

2. An electrical component failure detection apparatus according to claim 1 wherein said component means comprises a filter.

3. An electrical component failure detection apparatus according to claim 2 wherein said load is an antenna.

4. An electrical component failure detection apparatus according to claim 1 wherein said comparator means comprises a latch circuit.

5. An electrical component failure detection apparatus according to claim 4 wherein said comparator means includes two transistors connected as a differential amplifier.

6. An electrical component failure detection apparatus for use with radio frequency power generating equipment, comprising:
   power means for generating power signals;
   component means having an input terminal coupled to said power means and an output terminal, said component means receiving said power signals at said input terminal and developing corresponding output signals at said output terminal;
   load means coupled to said component output terminal for receiving said output signals;
   first means coupled to said power means for producing a first signal indicative of the forward power delivered to said component means by said power signals;
   second means coupled to said load means for producing a second signal indicative of the forward power delivered to said load means by said output signals;
   comparator means coupled to said first and second means for producing a failure detecting electrical control signal in response to said first and second signals.

7. An electrical component failure detection apparatus according to claim 6 which includes control means coupled to said power means and said comparator means for reducing said power signals received by said component means in response to said control signal.

8. An electrical component failure detection apparatus for use with radio frequency power generating equipment, comprising:

power means for generating power signals;

component means having an input terminal coupled to said power means and an output terminal, said component means receiving said power signals at said input terminal and developing corresponding output signals at said output terminal;

load means coupled to said component output terminal for receiving said output signals;

first means coupled to said power means for producing a first signal related to said power signals;

second means coupled to said load means for producing a second signal related to said output signals;

comparator means coupled to said first and second means for producing a failure detecting control signal in response to comparing said first and second signals; and control means coupled to said comparator means and said power means for reducing the magnitude of said power signals received by said component means in response to said failure control signal.

9. An electrical component failure detection apparatus according to claim 8 wherein said first means comprises a first directional coupler coupled between said power means and said component means, and said second means comprises a second directional coupler coupled between said component means and said load means.

10. An electrical component failure detection apparatus according to claim 9 wherein said first and second signals indicate the forward power delivered to said component means and said load means, respectively.

11. An electrical component failure detection apparatus according to claim 10 wherein said component means comprises a filter.

* * * * *